United States Patent [19]

Vigmostad et al.

[11] Patent Number: 5,412,999
[45] Date of Patent: May 9, 1995

[54] POSITION SENSING WITH MAGNETOSTRICTIVE STRESS SENSOR

[75] Inventors: Erik B. Vigmostad; Robert D. Klauber, both of Fairfield, Iowa

[73] Assignee: Sensorteck L.P., Fairfield, Iowa

[21] Appl. No.: 23,110

[22] Filed: Feb. 26, 1993

[51] Int. Cl.⁶ ............................................. G01L 3/02
[52] U.S. Cl. ................................ 73/862.333; 73/779; 73/862.334; 324/209
[58] Field of Search .................... 73/862.325, 862.328, 73/862.329, 862.331, 862.333, 862.334, 847, 779, 116; 324/207.21, 207.13, 209

[56] References Cited

U.S. PATENT DOCUMENTS

| | | | |
|---|---|---|---|
| 2,912,642 | 11/1959 | Dahle | 324/209 |
| 3,950,986 | 4/1976 | Parkinson | 73/862.28 |
| 4,697,460 | 10/1987 | Sugiyama et al. | 73/862.333 |
| 4,760,745 | 8/1988 | Garshelis | 73/862.334 X |
| 4,840,073 | 6/1989 | Aoki et al. | 73/862.334 |
| 4,939,937 | 7/1990 | Klauber et al. | 73/862.333 |
| 4,942,771 | 7/1990 | Sugimoto et al. | 73/862.334 |
| 4,972,726 | 11/1990 | Yoshimura et al. | 73/862.333 |
| 4,991,447 | 2/1991 | Yahagi et al. | 73/862.334 |
| 5,269,178 | 12/1993 | Uigmostad et al. | 73/116 |

OTHER PUBLICATIONS

SAE Paper #900264, Fleming, William J., "Magnetostrictive Torque Sensors—Comparison of Branch, Cross, and Solenoidal Designs," Feb. 26, 1990.
SAE Paper #920236, Klauber et al, "Miniature Magnetostrictive Misfire Sensor", Feb. 24, 1992.

Primary Examiner—Richard E. Chilcot, Jr.
Assistant Examiner—Elizabeth L. Dougherty
Attorney, Agent, or Firm—Michael, Best & Friedrich

[57] ABSTRACT

A device for monitoring both position and torque variations in a torque carrying member such as a shaft or flywheel functions by using a magnetostrictive torque sensor to monitor both torque variations and rotational position. The torque carrying member is structured with cutouts, protuberances, or material variations which cause the path reluctance for the flux produced by the magnetostrictive sensor to be different for different rotational positions of the shaft. This manifests as an output signal variation in the sensor which is dependent on position, and which can be used in conjunction with the magnetostrictively induced variations in signal to permit monitoring of both torque and position. The device is suitable for use with automotive engines and provides cost and space savings.

38 Claims, 4 Drawing Sheets

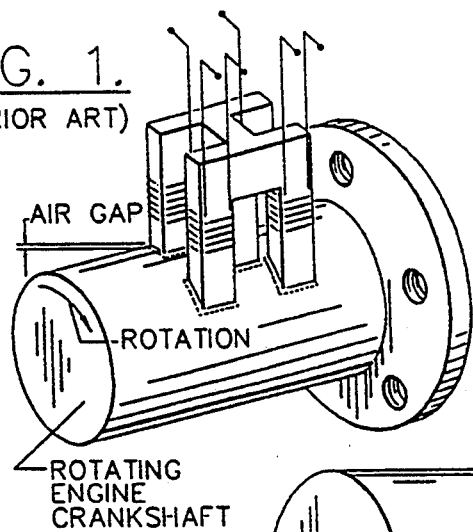
FIG. 1.
(PRIOR ART)
AIR GAP
ROTATION
ROTATING ENGINE CRANKSHAFT
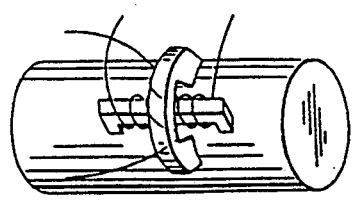
FIG. 2.
(PRIOR ART)
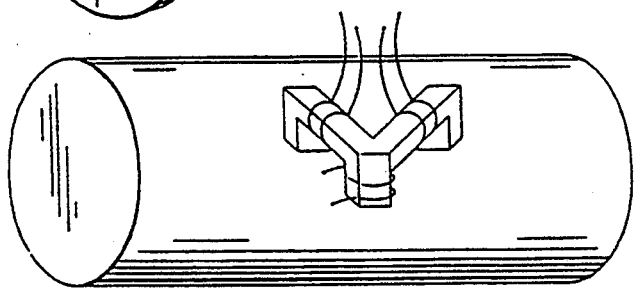
FIG. 3.
(PRIOR ART)
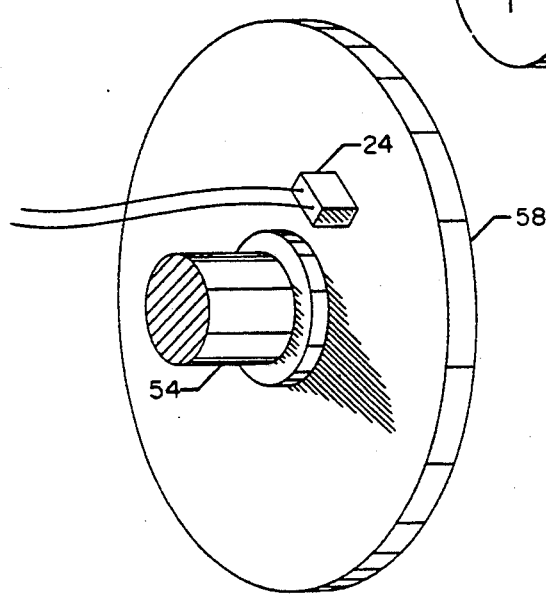
FIG. 4.
(PRIOR ART)
FIG. 6.
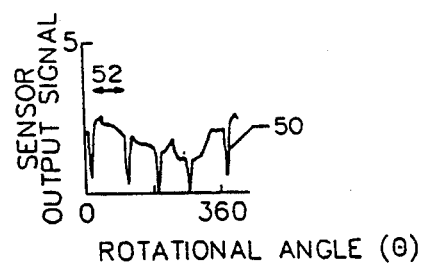
SENSOR OUTPUT SIGNAL
0    360
ROTATIONAL ANGLE (θ)

POSITION SENSING WITH MAGNETOSTRICTIVE STRESS SENSOR

RELATED APPLICATIONS

This application is a C.I.P. of PCT Patent Application PCT/US91/09280 filed on Dec. 10, 1991 which will be filed in the national stage as a U.S. patent application.

BACKGROUND OF THE INVENTION

1. Field of the Invention

This invention relates to magnetostrictive sensors used to monitor stress, torque, relative torque changes, misfire, knock, pre-ignition, engine roughness, and the like, and more particularly, to an improved method and apparatus for such monitoring which has the added advantage of permitting shaft rotational position measurement in addition to magnetostrictive stress sensing.

2. Description of Prior Art

Magnetostrictive sensors take advantage of the magnetostrictive property of ferromagnetic materials whereby tension stress typically increases (and compressive stress decreases) a given magnetic induction field (i.e., the "B" field) carried by the material. Typically, a source for the magnetic induction field comprises a coil of wire of arbitrary number of turns wrapped around a ferromagnetic core and supplied with an appropriate level of electric current. The flux produced by the coil/core (the "primary" core/coil) passes through the material being stressed and hence changes with variations in stress levels within the material. Another one or more coil/core configurations (the "secondary" or "pickup" coil/core[s]) may then be used to monitor the magnetic flux changes using Faraday's law. Flux which varies with stress levels in the material passes through the secondary coil resulting (via Faraday's law) in voltage changes across the secondary coil. These voltage variations may then be correlated with stress levels in the material.

Many variations on this basic theme exist. For example, instead of a pickup coil, a Hall effect sensing element may be used. Instead of a primary coil/core, a permanent magnet may be used. In other configurations, the pickup and primary coil may be one and the same. Also, the magnetostrictive sensor may be used next to a shaft, torque disk, or other torque carrying member primarily to provide an indication of the level of torque in said member.

Several different designs of magnetostrictive sensor exist. These include, but are not limited to, the four branch design of FIG. 1, the cross design of FIG. 2, the two branch design of FIG. 3, the single branch design, and the solenoidal design. In SAE Technical Paper 900264, Fleming describes and compares these various designs and provides references to a considerable body of research work which has been done on magnetostrictive sensors.

FIG. 4 illustrates a device shown by Sugiyama in U.S. Pat. No. 4,697,460 wherein a magnetostrictive sensor is mounted adjacent the flywheel of an internal combustion engine instead of adjacent the shaft.

In their own prior work, shown in part in SAE paper #920236 and in PCT patent application PCT/US91/09280, the present inventors have tested magnetostrictive sensors extensively on automotive engines, and have devised a sensor system which monitors torque variations caused by misfire and other causes extremely well.

In addition to the value provided by a system which can monitor torque variations, automotive engine control units need a position sensor to indicate the instantaneous position of the engine crankshaft. This aids in setting proper timing and in other engine control and diagnostic applications.

Position sensors currently used are usually variable reluctance or Hall effect devices. These sensors are normally located adjacent an iron or steel ring gear which is tightly fitted around some portion of the driveline. The ring gear typically has teeth cut in it such that as the drive line turns, first one tooth, then a space between teeth, then another tooth, then another space, etc. passes sequentially under the sensor head. The sensor head emits magnetic flux such that the flux varies with the magnetic reluctance of the flux path, and the reluctance in turn varies depending on whether a tooth or a space is passing next to the sensor head. The change in flux is monitored as a change in voltage out of either a pickup core (variable reluctance type position sensor) or a Hall effect device.

At present, however, there is no known sensing system which includes the benefits of torque variation sensing employing magnetostriction along with position sensing wherein both torque and position may be sensed using the same sensor head. Hence the cost for performing these two monitoring functions is effectively twice the cost of monitoring either one.

There is, therefore, at present no known means for monitoring both magnetostrictive effects and shaft position using a single sensor head and saving almost half of the expense presently involved in performing both of these diagnostics.

In all of the work which has been done to date on magnetostrictive sensors, no suggestion or teaching exists which utilizes a magnetostrictive sensor for the additional function of monitoring position.

OBJECTS AND ADVANTAGES OF THE INVENTION

Accordingly, a major object and advantage of the present novel means for utilizing magnetostrictive stress sensing includes a method or means for monitoring shaft rotational position employing the same sensor head as that used for stress sensing, thereby resulting in considerable cost savings. The present invention has the additional advantage of occupying less space within the engine environment than prior alternative technologies.

Further objects and advantages of the invention will become apparent from a consideration of the ensuing description of it.

SUMMARY OF THE INVENTION

The present invention, in various embodiments, provides significant cost and space savings for torque transmitting members such as a shaft or torque disk which must be monitored for both stress and rotational position.

The invention takes advantage of the fact that magnetostrictive sensors function by using magnetic flux and by measuring relatively small changes in said flux due to changes in stress in the shaft/disk material through which said flux passes. As the stress state changes, the reluctance of the flux path changes due to magnetostriction resulting in said relatively small changes in flux. These small flux changes are measured and correlated with the stress in the shaft or torque disk (and thereby also with torque).

By purposely modifying a shaft or torque disk in specific locations, large changes in flux path reluctance can be achieved. For example, by cutting grooves or cut-outs on a shaft circumference and rotating the shaft such that regions with and without such cut-outs pass under the head of the magnetostrictive sensor, the flux path will alternately have larger and lesser path reluctance. Where a cut-out exists the reluctance will be larger and the flux smaller; where no cut-out exists, the reverse will occur. These reluctance (and hence flux) changes are considerably greater than those caused by magnetostrictive effects.

The same sensor head may be used to provide flux for both purposes—magnetostrictive measurement via small flux/reluctance changes and also monitoring of surface modification location via large flux/reluctance changes. By knowing where around the shaft the cut-outs are located, correlation between large changes in flux and position can readily be made by anyone skilled in the art. Small changes in flux due to magnetostrictive effects may still be observed which are independent from the shaft modification caused large changes in flux. In the present invention these small changes are correlated with torque, and the large changes are correlated with position.

The surface modifications can be on any torque transmitting member and include torque disks such as flywheels on internal combustion engines. The surface modifications can be grooves, cutouts, holes passing completely through or only partially through the member, indentations, concave or convex sides of bosses, added material, material projecting above the surface of the member, teeth (such as those on a typical ring gear), different type material sections within the member, or any other suitable modification which causes flux reluctance path changes.

Many other embodiments may become obvious to those skilled in the art. Any method or apparatus whereby a magnetostrictive sensor is also used to monitor position of a member comprises the present invention.

The invention, in its various embodiments, solves the cost and space problems associated with prior art in a superior and wholly satisfactory manner.

BRIEF DESCRIPTION OF THE DRAWINGS

Drawings Illustrating Prior Art

FIG. 1 depicts a four branch magnetostrictive sensor next to a shaft.

FIG. 2 depicts a cross design magnetostrictive sensor next to a shaft.

FIG. 3 depicts a two branch magnetostrictive sensor next to a shaft.

FIG. 4 depicts a magnetostrictive sensor next to a torque disk.

Drawings Illustrating the Present Invention

Figure 5:
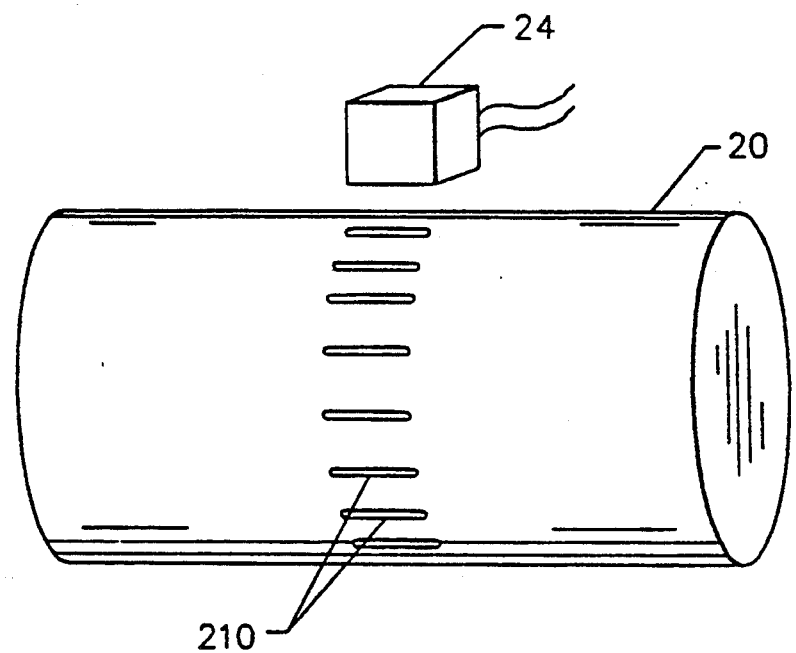

FIG. 5 depicts one embodiment of the present invention with grooves cut in a shaft.

FIG. 6 shows a typical signal from an embodiment of the present invention.

Figure 7:
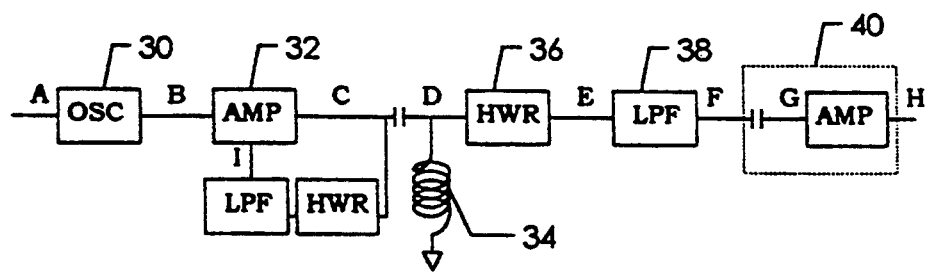

FIG. 7 shows one possible means for electronic signal processing for the present invention.

Figure 8:
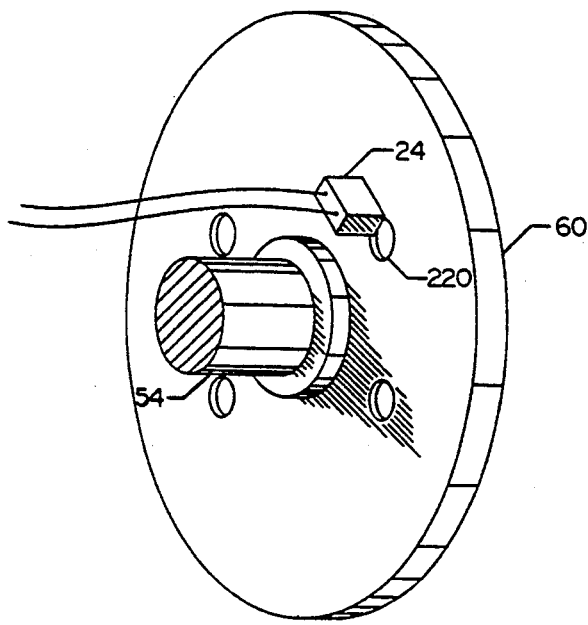

FIG. 8 shows another embodiment of the present invention with holes cut in a torque disk.

Figure 9:
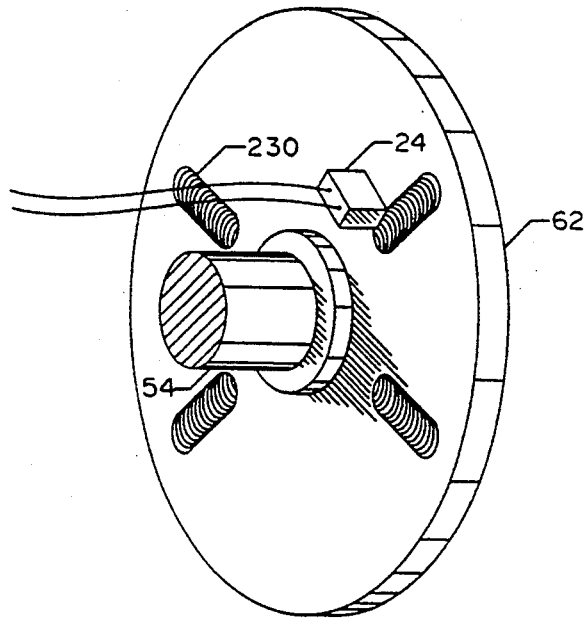

FIG. 9 shows another embodiment of the present invention with indentations in a torque disk.

Figure 10:
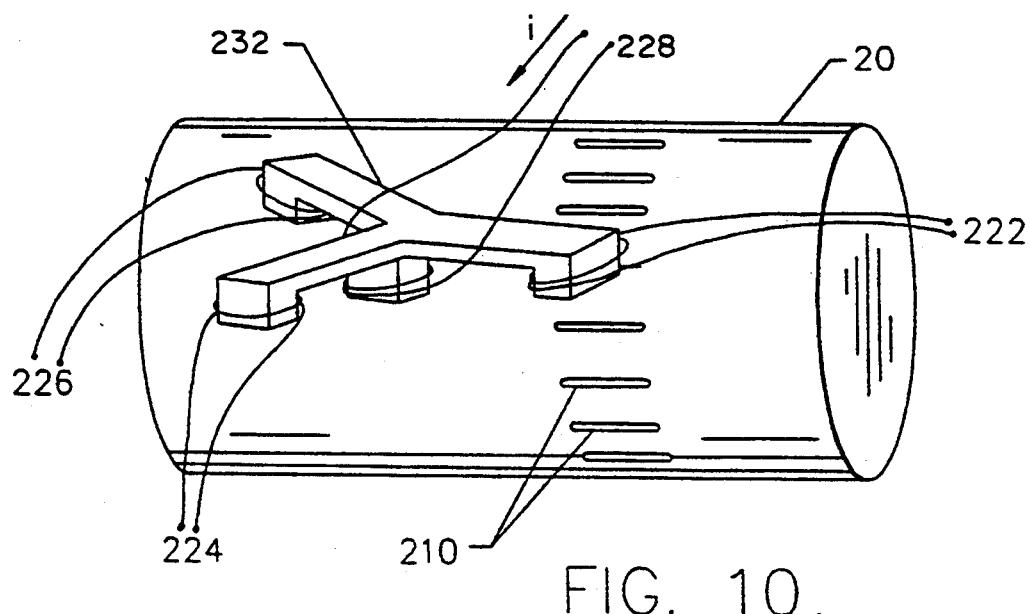

FIG. 10 shows another embodiment of the present invention wherein the magnetostrictive element of the sensor and the position sensing element share a common driver core leg.

DETAILED DESCRIPTION OF THE INVENTION

Previous art have not provided a simple, cost effective, space saving means whereby magnetostrictive sensing and position sensing can be accomplished using the same sensor head for both sensing functions. The present invention, in different embodiments, involves an alternative methodology which solves this and other problems associated with prior art.

It does this by using the flux provided by the sensor head and monitoring flux changes due to two causes: magnetostrictive effects (relatively small) and reluctance changes due to positional variations in geometry or material (relatively large).

Any means or method which may be used to monitor both magnetostrictive effects and geometric/material variation effects via flux from the same sensing system is comprised by the present invention.

Embodiment 1

The first embodiment is illustrated in FIG. 5. It comprises a magnetostrictive sensor head 24 placed adjacent (with an air gap in between) a torque transmitting shaft 20. The shaft has grooves 210 cut on its surface which would cause significant changes in the output signal of the sensor head 24. The grooves could also be protuberances, holes, bosses, indentations, teeth, cutouts, sections of material different from the shaft 20, or the like. For purposes of efficiency in language use of any one of the terms "grooves" (or elements 210), protuberances, holes, bosses, indentations, teeth, sections of material different from the torque transmitting element, etc. from henceforth herein shall be considered to imply any other of these or similar terms which represent geometric or material configurations which will alter magnetic path reluctance significantly. In the case of teeth or other protuberances, said teeth or other protuberances could be mounted on a separate sub-structure such as the flag gears commonly found on automobile engine flywheels. Alternatively such teeth could be cut directly from the shaft or other torque transmitting member material.

With known distances between grooves 210, it is a simple matter for those skilled in the art to correlate shaft rotational position with sensor output signal spikes. The grooves may be equally spaced to make it simpler to determine position, although this is not necessary. One groove may be larger or smaller than other grooves and used as a "marker" for a certain location on the shaft. In an internal combustion engine this may by TDC, for instance. Rotational velocity may be readily determined by anyone skilled in the art by noting time between signal pulses caused by the grooves 210.

The sensor 24 may be any type of magnetostrictive sensor as described herein or elsewhere in the literature. Sensing of stress in the shaft 20 may be done as usual with the signal pulses from the grooves 210 ignored when the rest of the signal is processed in any suitable way to monitor stress/torque changes.

The sensor head 24 does not have to be positioned directly over the grooves 210 but may be anywhere within the proximity of such grooves such that the flux is affected measurably by the grooves.

In magnetostrictive sensing systems the primary flux is typically driven by a primary electric circuit carrying electric current, and the secondary flux variations are monitored by a secondary electric circuit. (Variations to this are described elsewhere hereto.) In any embodiment of the present invention, either the primary or secondary flux path may be used to monitor position. For example, in a cross design magnetostrictive sensor, magnetostrictively induced flux variations in the secondary flux are reflected in a voltage change across the coil of the secondary (pickup) coil. Variations from groovelike geometric or material variations would also be reflected as such a secondary circuit voltage change. Hence the secondary coil voltage could be used to monitor both magnetostrictively induced flux changes (small) and geometric/material induced flux changes (large).

It is also possible to use the flux changes in the primary flux due to geometric/material variations to monitor position. Both the primary and the secondary circuits experience significant changes in voltages and other circuit parameters caused by grooves or other geometric/material variations. Hence either of the two circuits may be used to to monitor position and use of either is comprised by the present invention.

Any suitable circuit parameter change such as current change in the secondary circuit, voltage change in any pan of the circuit, phase changes, current change in the primary, and the like may be used to monitor position.

The signal used to monitor position, be it from the secondary or primary circuit, typically displays significant and rapid changes in magnitude and exhibits rather distinct extrema (maxima or minima). These rapid changes may be characterized as "spikes" 50 as illustrated in one possible configuration in FIG. 6. (As shown in the figure, the spikes 50 are actually inverted spikes and represent a marked reduction in signal amplitude for positive signal sensitivity to flux. For negative sensitivity the spikes may be increases, rather than decrease, in signal amplitude. The invention comprises both positive and negative sensitivity to flux configurations.) Typically each extrema represents the central point of the groove or other modification and may be used to indicate shaft position. Other locations on the "spikes" may be used to indicate position as well and such techniques are well known to those skilled in the art.

The signal of FIG. 6 may be from either the primary or secondary circuit. In the case where it is generated by the secondary circuit, the magnetostrictive effects from stress change in the shaft will also be reflected in the signal, generally in the regions 52 between spikes 50. Hence, given that the signal of FIG. 6 is from the pickup circuit, two important forms of information regarding the shaft are contained within it—the spikes 50 indicate shaft position and the regions 52 indicate stress state of the shaft via magnetostriction. Those skilled in the art can readily detect position using the spikes 50 and standard variable reluctance position measurement techniques which are widely known and practiced. With the position indication, those skilled in the art can also readily monitor the changes in signal level in the regions 52 using standard techniques for magnetostrictive sensing over specific circumferential regions of the shaft. For example, such methodology is described in applicants' PCT patent application PCT/US91/09280 of which the present application is a continuation in part.

The present invention is not, however, restricted to magnetostrictive measurement in the regions 52 between spikes 50. It also comprises magnetostrictive monitoring over any portion, or even all, of the signal, and hence may even include some portion, or all, of the spikes 50. This is because the magnetostrictive effects are, in effect, superimposed on the signal and have some effect on the amplitude of the spikes 50. Even when the sensor head is directly over a groove, for example, some flux is still passing through regions experiencing stress and hence the signal will be affected magnetostrictively even then. Hence, anyone skilled in the art of magnetostrictive sensing could simply use any portion of the signal generated by a magnetostrictive sensor as utilized in the present invention to monitor stress/torque variations.

FIG. 7 shows a typical electronic circuit which may be used on a primary coil of a magnetostrictive sensor to monitor position. This circuit may also be used on a secondary signal output from such a sensor wherein the signal at point D in the circuit could be the output from the secondary (pickup) instead of the driver as shown in FIG. 7. The circuit shown in FIG. 7 is not the only such circuit comprised by the invention, but it illustrates one means by which the signal may be processed.

An oscillator 30 is used with an amplifier 32 to provide alternating voltage and hence AC current to the driver coil 34. The voltage D at the driver coil 34 is rectified by the half wave rectifier (HWR) 36 and filtered by a wide band low pass filter (LPF) 38 to produce the primarily DC offset signal F. The signal F has "spikes" in it due to the grooves (holes, teeth, etc) on the shaft. The capacitor/amp combination 40 removes the DC bias and amplifies the spikes. These spikes in signal H at the output side of element 40 may then be "cleaned up" with a hysteresis amplifier if needed and used (typically by an engine control unit) as position indicators. Note that the driver voltage C is controlled slowly (so that spikes are removed from the feedback value I).

Instead of voltage at D, the current (or, equivalently, the voltage across a resistor) may be monitored at D and processed as shown in FIG. 7.

All of the statements made in this embodiment which are generically applicable to other embodiments are also applicable to other such embodiments. For example, unless specifically stated otherwise, any of the terms such as grooves, cutouts, protuberances, indentations, holes, teeth, bosses, material section changes, and the like may be, as discussed above, interchanged with any of the others, i.e., any term which has similar effect on the flux path reluctance may be, for purposes of the invention description, considered interchangeable with any other such term. Similarly, the sensor head does not have to be placed directly over grooves or other modifications in any embodiment regardless of how such an embodiment is shown in the figures. In addition, any term such as "shaft" or "torque disk" used anywhere herein may be considered generically as "torque transmitting member."

Many other possible manifestations of this embodiment would be obvious to those skilled in the art and all such other manifestations are comprised by the present invention.

Embodiment 2

A second embodiment is shown in FIG. 8 and comprises a torque disk 60 such as the flywheel of an internal combustion engine and a magnetostrictive sensor 24 adjacent said torque disk wherein holes 220 are drilled in the disk 60. Torque is transmitted through the disk, producing shear stress in the disk material. The holes 220 shown in the figure are drilled completely through the disk, but that is not necessary for the functioning of the invention. The holes could be cutouts which do not completely pass through the disk.

The holes 220 in the disk 60 function in the present embodiment as did the grooves (or holes or cutouts or teeth or etc) in embodiment 1. That is, the significant change in reluctance for the flux generated by the magnetostrictive sensor 24 which occurs each time a hole 220 passes by the sensor 24 manifests in both the driver and pickup circuits as changes in circuit parameters such as voltage, current, phase, etc. Monitoring of these changes in such a circuit parameter may be carried out in similar fashion as that discussed in the description of the first embodiment.

As in the first embodiment, the sensor 24 may also function as a monitor of stress/torque variations via magnetostriction. All of the methodology for signal processing to monitor both position and stress as described in embodiment 1 are directly applicable in the present embodiment.

The advantages of the present embodiment include the cost and space savings already discussed, but in addition, the present embodiment facilitates simpler mounting of the sensor. For automotive engines, in particular, it is often difficult to find a location close to the shaft where a magnetostrictive sensor may be mounted. This problem is overcome in the present embodiment since it is much easier to mount the sensor adjacent the flywheel where more space exists and where mounting sites are more practical (for example, on the rear of the engine block.)

Embodiment 3

FIG. 9 illustrates a third embodiment of the invention in which a torque disk 62 similar to that of embodiment 2 has indentations 230 or bosses instead of holes. Indentations 230 such as those shown in FIG. 9 have an advantage over holes in that the strength of the disk in the axial direction is not so compromised. The indentations 230 are utilized for position sensing in similar fashion as are comparable modifications to torque transmitting elements in other embodiments.

As with previous embodiments, many possible variations would be obvious to those skilled in the art, and any and all such combinations are comprised by the invention.

Embodiment 4

FIG. 10 shows another embodiment of the present invention wherein a magnetostrictive sensing means is combined with a variable reluctance sensing means in the dual function sensor 232. In dual function sensor 232, the left side as shown in the figure functions as a two branch magnetostrictive sensor means wherein primary or driver coil 228 has current supplied to it and generates flux, and wherein pickup coils 224 and 226 monitor the changes in flux associated with changes in stess in the shaft 20. Part of the flux generated in the central core via driver coil 228 passes along the shaft and through pickup coil 222. The grooves on shaft 20 cause variations to occur in the flux passing through pickup coil 222 as described elsewhere herein.

The present embodiment provides a means whereby the magnetostrictive stress and variable reluctance monitoring may be carried out on effectively different locations on a torque transmitting element and yet both functions are still carried out by the same sensor structure. This can be of advantage if a fairly large number of location indicators (such as grooves 210) are needed around the circumference of the torque transmitting element. In the manner described in the present embodiment, the magnetostrictively dependent output (from coils 224 and 226 in FIG. 10) is virtually unaffected by the changing reluctance caused by the location indicators (such as grooves 210). This can also improve accuracy of the magnetostrictive signal.

The signals generated by coils 224 and 226 may be processed in a manner familiar to those skilled in the art of magnetostrictive measurement; and the signal from coil 222 may be processed in a manner familiar to those skilled in the art of variable reluctance position measurement.

As in other embodiments, the grooves 210 do not have to be grooves per se, and may be any geometric or material variation in the torque transmitting element which causes suitable variation in reluctance. Also, as in other embodiments, although pickups are shown as coils, Hall sensors may be used instead; and although flux drivers are shown as coils, permanent magnets may be used instead.

Further, although a two branch magnetostrictive sensing configuration is shown in FIG. 10, this embodiment comprises any type of magnetostrictive sensing design employed in such a manner in combination with a variable reluctance branch so long as the variable reluctance branch and the magnetostrictive means share a common flux source (such as drive coil 228.) For example, in place of a two branch design, a different configuration of the present embodiment may use a cross design magnetostrictive means. In such a configuration, an E shaped core may be used such that the central leg has a driver coil (such as 228) on it which supplies flux to both outer legs. One outer leg has a pickup coil (such as 222) which is used to monitor position via variable reluctance. The other outer leg also receives flux produced in the central leg, but between that outer leg and the central leg is a pickup core typical for cross design magnetostrictive sensors (see FIG. 2.)

Obvious variations on these configurations abound and comprise use of any type of magnetostrictive sensing means (single branch, four branch, etc.) sharing a flux driver source and leg with a variable reluctance sensing means. Also, as in other embodiments, a ting gear or other similar functioning element with one or more protuberances such as teeth (or indentations, etc.) may be attached to the torque transmitting element and used instead of cutouts, indentations, grooves, bosses, or the like which are directly a part of the torque transmitting element. This embodiment of the invention is comprised by any configuration in which separate pickups exist for magnetostrictive sensing and position sensing wherein the flux source (the driver) is shared by both the magnetostrictive and the position sensing means.

Other Embodiments

The invention comprises any method or means whereby a magnetostrictive sensor may be used to monitor both stress/torque variations and rotational position of a torque transmitting element by locally modifying the geometric or material characteristics of the torque transmitting element. These modifications may comprise, for example, grooves, holes, indentations, bosses, teeth, cutouts, concave or convex geometric alterations, added material, material projecting above the surface of the member, slots, sections of different material type, or the like. The particular size, shape, dimensions, and locations of such modifications is not critical and any size, shape, dimensions, or locations which permit the functioning of the invention are comprised by the invention. The number of such modifications is also arbitrary and may vary as needed on a case by case basis. Any number of such modifications is comprised by the invention.

In the case of teeth, said teeth may be mounted on a ring gear which is a sub-structure mounted onto the disk or other torque transmitting member. For the disk in particular, said ring gear may be located on one face of the disk (as opposed to the outer rim) such that the teeth face axially or somewhat axially rather than radially.

Further, a particular type of magnetostrictive sensor (for example, such as the cross design of FIG. 2) may be placed in the same sensor housing with a separate position sensor, and such configuration is also comprised by the invention. Such placement of two sensing devices inside the same housing can result in cost and space savings similar to those provided by other embodiments shown herein. Further, the electronics used with both sensors may also be combined in the same housing thereby effecting yet further cost and space savings.

Advantages Over Prior Art

This invention can thus be seen to provide inherent cost and space savings over prior art which utilizes magnetostrictive torque sensing with internal engines or other devices which also utilize position sensing.

While the above description contains many specificities, the reader should not construe these as limitations on the scope of the invention, but merely as exemplifications of preferred embodiments thereof. Those skilled in the art will envision many other possibilities that are within its scope.

Any device which comprises a magnetostrictive sensor for monitoring both stress and position is comprised by the present invention. Any device which combines a magnetostrictive sensor along with a separate sensor for monitoring position in the same sensor head is also comprised by the present invention.

All comments made in any embodiment which are of a generic nature are applicable to all possible embodiments of the invention.

Accordingly, the scope of the invention should be determined not by the embodiments described, but by the appended claims and their legal equivalents.

We claim:

1. A device for monitoring both stress variation and position of a torque transmitting element, the device comprising:

a magnetostrictive sensing element which induces magnetic flux in at least a portion of the torque transmitting element and which generates a magnetostrictive sensing element signal and allows detection of the stress variation in said torque transmitting element, and said portion of the torque transmitting element including at least two regions on said torque transmitting element, one of said regions being a variation in structure on said torque transmitting element with respect to said other region so that a difference exists in said torque transmitting element between reluctance for magnetic flux produced by the magnetostrictive sensing element when the at least one region of the torque transmitting element is near said magnetostrictive sensing element and reluctance for magnetic flux produced by the magnetostrictive sensing element when the other region of the torque transmitting element is near said magnetostrictive sensing element, and said difference effects a variation in the magnetostrictive sensing element signal so that said signal is used to monitor the position of the torque transmitting element.

2. The device of claim 1 wherein the variation in structure is a geometric variation.

3. The device of claim 1 wherein the variation in structure is a cutout.

4. The device of claim 1 wherein the variation in structure is a material variation.

5. The device of claim 1 wherein the torque transmitting element is a disk.

6. The device of claim 5 wherein the at least one region is at least one hole.

7. The device of claim 5 wherein the at least one region is at least one indentation.

8. The device of claim 5 wherein the at least one region is at least one tooth.

9. The device of claim 5 wherein the at least one region is at least one cutout.

10. The device of claim 5 wherein the at least one region is at least one boss.

11. The device of claim 5 wherein the at least one region is at least one protuberance which protrudes with respect to the other region of the disk.

12. The device of claim 5 wherein the at least one region comprises material of different composition from material comprising the other region of the disk.

13. The device of claim 1 wherein the torque transmitting element is a shaft.

14. The device of claim 13 wherein the at least one region is a cut out.

15. The device of claim 13 wherein the at least one region is at least one protuberance which protrudes with respect to the other region of the shaft.

16. The device of claim 13 wherein the at least one region comprises material of different composition from material comprising the other region of the shaft.

17. A device for monitoring both stress variation and position of a torque transmitting element, the device comprising:

a magnetostrictive sensing means for inducing magnetic flux in at least a portion of the torque transmitting element, for generating a circuit parameter of said magnetostrictive sensing means, and for detecting stress variation in said torque transmitting element, and said portion of the torque transmitting element including at least two regions on said torque transmitting element, one of said regions being a variation in structure on said torque transmitting element with respect to said other region so that a difference exists in said torque transmitting element between magnetic reluctance for magnetic flux passing from the magnetostrictive sensing means when the at least one region of the torque transmitting element is near said magnetostrictive sensing means and magnetic reluctance for magnetic flux passing from the magnetostrictive sensing means when the other region of the torque transmitting element is near said magnetostrictive sensing means, and said difference effects a variation in the circuit parameter so that said circuit parameter allows detection of the position of the torque transmitting element.

18. The device of claim 17 wherein the circuit parameter is current.

19. The device of claim 17 wherein the variation in structure is a geometric variation.

20. The device of claim 17 wherein the variation in structure is a cutout.

21. The device of claim 17 wherein the variation in structure is a material variation.

22. The device of claim 17 wherein the torque transmitting element is a disk.

23. The device of claim 22 wherein the at least one region is at least one hole.

24. The device of claim 22 wherein the at least one region is at least one indentation.

25. The device of claim 22 wherein the at least one region is at least on tooth.

26. The device of claim 22 wherein the at least one region is at least one cutout.

27. The device of claim 22 wherein the at least on region is at least one boss.

28. The device of claim 22 wherein the at least one region is at least one protuberance which protrudes with the respect to the other region of the disk.

29. The device of claim 22 wherein the at least one region comprises material of different composition from material comprising the other region of the disk.

30. The device of claim 17 wherein the torque transmitting element is a shaft.

31. The device of claim 30 wherein the at least one region is cut out.

32. The device of claim 30 wherein the at least one region is at least one protuberance which protrudes with respect to the other region of the shaft.

33. The device of claim 30 wherein the at least one region comprises material of different composition from material comprising the other region of the shaft.

34. The device of claim 17 wherein the magnetostrictive sensing means includes a driver circuit having a voltage and wherein said circuit parameter is said voltage of said driver circuit.

35. A device for monitoring both stress variation and position of a torque transmitting element, the device comprising:
a housing;
magnetostrictive sensing means in said housing for inducing magnetic flux in at least a portion of the torque transmitting element to detect stress variations in said torque transmitting element, said magnetostrictive sensing means including position sensing means for detecting the position of the torque transmitting element.

36. The device of claim 35 wherein the magnetostrictive sensing means and the position sensing means share a same flux source and wherein the magnetostrictive sensing means includes a first means for monitoring flux in the torque transmitting member and wherein the position sensing means includes a second means for monitoring flux in the torque transmitting member.

37. The device of claim 35 wherein the magnetostrictive sensing means comprises a cross design magnetostrictive sensor.

38. The device of claim 35 wherein said portion of said torque transmitting element includes at least two regions on said torque transmitting element, one of said regions being a variation in structure with respect to said other region such that a difference exists in said torque transmitting element between reluctance for magnetic flux produced by said magnetostrictive sensing means when said one region of said torque transmitting element is near said magnetostrictive sensing means and reluctance for magnetic flux produced by said magnetostrictive sensing means when said other region of said torque transmitting element is near said magnetostrictive sensing means and wherein said difference is used by the position sensing means to generate a signal indicative of the position of the torque transmitting element.

* * * * *